(12) United States Patent
Somers

(10) Patent No.: US 10,552,925 B2
(45) Date of Patent: Feb. 4, 2020

(54) ELECTRICITY DISTRIBUTION ARRANGEMENT, SYSTEM AND METHOD

(71) Applicant: Brian Jacob Somers, Sacramento, CA (US)

(72) Inventor: Brian Jacob Somers, Sacramento, CA (US)

(73) Assignee: Standard Microgrid, Inc., Sacramento, CA (US)

( * ) Notice: Subject to any disclaimer, the term of this patent is extended or adjusted under 35 U.S.C. 154(b) by 299 days.

(21) Appl. No.: 15/339,944

(22) Filed: Nov. 1, 2016

(65) Prior Publication Data

US 2017/0154387 A1 Jun. 1, 2017

(51) Int. Cl.
*G06Q 50/06* (2012.01)
*H02J 3/14* (2006.01)
*G07F 15/00* (2006.01)

(52) U.S. Cl.
CPC ........... *G06Q 50/06* (2013.01); *G07F 15/003* (2013.01); *H02J 3/14* (2013.01); *H02J 2003/143* (2013.01)

(58) Field of Classification Search
CPC .................................................... G06Q 50/06
USPC .......................................................... 705/39
See application file for complete search history.

(56) References Cited

U.S. PATENT DOCUMENTS

| 5,436,510 A * | 7/1995 | Gilbert | H02J 3/14 307/38 |
|---|---|---|---|
| 6,891,478 B2 * | 5/2005 | Gardner | H02J 3/14 307/11 |
| 7,149,605 B2 * | 12/2006 | Chassin | H02J 3/14 700/295 |
| 7,218,996 B1 | 5/2007 | Neale | |
| 7,218,998 B1 * | 5/2007 | Neale | H02J 3/14 700/295 |
| 7,561,977 B2 * | 7/2009 | Horst | H02J 3/14 700/295 |
| 8,140,279 B2 * | 3/2012 | Subbloie | G06Q 50/06 700/296 |
| 8,319,599 B2 * | 11/2012 | Aisa | G05B 19/0423 307/39 |
| 8,583,520 B1 * | 11/2013 | Forbes, Jr. | G05D 17/00 705/34 |
| 8,990,590 B2 * | 3/2015 | Benson | H02J 3/14 700/295 |
| 9,207,698 B2 * | 12/2015 | Forbes, Jr. | H02J 3/14 |
| 9,437,070 B2 | 10/2016 | Marincola | |

(Continued)

*Primary Examiner* — Jason C Olson

(57) ABSTRACT

Disclosed are systems and methods for monitoring and controlling the distribution of electricity. The power distribution platform includes an intelligent device that controls power delivery to a singular or plurality of end users. The device controls the times during which energy is delivered, and limits the electrical current available on a per socket basis. By limiting current draw, system operators can ensure that only high value appliances (LED lights, phone charging etc.) are powered. Local intermediaries buy credit in bulk from a power system operator, then sell it to users via a portable digital storage medium and mobile device in increments of days, weeks or months. Once loaded with credit, a user's power program is allowed to continue running for the specified duration. Further aspects of the embodiment include; usage data logging to cloud server, power theft detection and methods of synchronizing internal clocks of each intelligent device.

6 Claims, 9 Drawing Sheets

(56) References Cited

U.S. PATENT DOCUMENTS

| | | | | |
|---|---|---|---|---|
| 9,703,342 B2* | 7/2017 | Nicholson | | H04L 12/10 |
| 9,837,820 B2* | 12/2017 | Santinato | | H02J 3/008 |
| 9,941,647 B2* | 4/2018 | Huang | | H01R 25/006 |
| 2009/0207034 A1* | 8/2009 | Tinaphong | | H02H 9/042 |
| | | | | 340/635 |
| 2010/0328849 A1* | 12/2010 | Ewing | | G06F 1/266 |
| | | | | 361/622 |
| 2011/0025267 A1* | 2/2011 | Kamen | | B60L 8/003 |
| | | | | 320/109 |
| 2011/0187193 A1* | 8/2011 | Pan | | H02J 3/14 |
| | | | | 307/39 |
| 2012/0083934 A1* | 4/2012 | Jesudason | | G06F 1/3203 |
| | | | | 700/291 |
| 2012/0095610 A1* | 4/2012 | Chapel | | H02J 13/0082 |
| | | | | 700/297 |
| 2012/0173177 A1* | 7/2012 | Nishiyama | | H02J 13/0017 |
| | | | | 702/62 |
| 2012/0296794 A1* | 11/2012 | Boot | | G06Q 10/02 |
| | | | | 705/37 |
| 2012/0296836 A1* | 11/2012 | Hisano | | H01M 8/00 |
| | | | | 705/317 |
| 2013/0006430 A1* | 1/2013 | Tomiyama | | H02J 3/008 |
| | | | | 700/286 |
| 2013/0026972 A1* | 1/2013 | Luke | | G07F 17/12 |
| | | | | 320/106 |
| 2014/0172184 A1* | 6/2014 | Schmidt | | G05B 15/02 |
| | | | | 700/295 |
| 2014/0248802 A1* | 9/2014 | Hieda | | H04L 12/2818 |
| | | | | 439/620.01 |
| 2015/0006343 A1* | 1/2015 | Sako | | B60L 11/1818 |
| | | | | 705/34 |
| 2015/0220101 A1* | 8/2015 | Aisa | | G05F 3/04 |
| | | | | 307/31 |
| 2015/0241898 A1* | 8/2015 | Marom | | G06Q 50/06 |
| | | | | 307/66 |
| 2015/0301546 A1 | 10/2015 | Hornor | | |
| 2015/0311752 A1 | 10/2015 | Luebke et al. | | |
| 2015/0355667 A1* | 12/2015 | Kogo | | H02J 3/14 |
| | | | | 307/52 |
| 2016/0145903 A1* | 5/2016 | Taylor | | H02J 7/00 |
| | | | | 701/2 |
| 2016/0197478 A1 | 7/2016 | Khaitan et al. | | |
| 2017/0039372 A1* | 2/2017 | Koval | | G01D 4/004 |

* cited by examiner

ELECTRICITY DISTRIBUTION ARRANGEMENT, SYSTEM AND METHOD

CROSS-REFERENCE TO RELATED APPLICATIONS

The present application claims the benefit of South African Provisional Patent Application PA164311/P filed Nov. 4, 2015, in South Africa, by the present inventor, which is incorporated by reference.

TECHNICAL FIELD

The present invention relates to power supply, distribution, consumption, billing and metering, and more particularly to a system designed to intelligently monitor and control a micro power utility.

BACKGROUND OF THE INVENTION

The following is a tabulation of some prior art that presently appears relevant:

US Patents

| Pat. No. | Kind Code | Issue Date | Patentee |
|---|---|---|---|
| 7,218,998 | B1 | May 15, 2007 | Neale |
| 0,287,263 | B1 | Sep. 6, 2016 | Marincola |

US Patent Application Publications

| Pub. Number | Kind Code | Pub. Date | Applicant |
|---|---|---|---|
| 0,197,478 | A1 | Jul. 7, 2016 | Khaitan, Dickinson |
| 0,301,546 | A1 | Oct. 22, 2015 | Hornor |
| 0,311,752 | A1 | Oct. 29, 2015 | Luebke, Schoepf |

Nonpatent Literature Documents

Spark Meter Functionality, http://www.sparkmeter.io/#architecture, viewed 14 Oct. 2016

Lumeter Product Catalog, http://www.lumeter.net/solutions/: https://www.dropbox.com/s/4qdw8cz9l6xo0pp/Lumeter%20complete-catalogue v5.pdf?dl=0, viewed 14 Oct. 2016

THIS invention relates to an electricity distribution arrangement, system and method for distributing electricity to electrical appliances.

The way in which electric utilities supply, distribute, meter and sell power is similar around the world. Centralized large generation facilities produce power and distribute it over long distances to end users and the utility charges customers based on the number of kilowatt-hours (kWhs) they consume. As the cost of traditional energy sources rises along with increased energy demand, this traditional system architecture is proving expensive and unreliable. This is especially true in developing countries where populations are widely dispersed, population growth is high and energy production is low.

Renewable energy and off-grid, distributed power systems offer an alternative solution to providing energy access. In many cases, the state of the art systems modify the existing large scale power utility model of selling kWhs and forecasting and responding to demand to suit a smaller power system. The Inventor has found that there are a number of issues that arise from this approach.

First, the Inventor has found that individuals are willing and able to pay significantly different prices per kWh depending on how they are using the power. Take for example a typical rural Zambian who pays $0.50 USD to charge a 5 Watt cell phone for an hour from a local vendor. In this case, the person is willing and able to pay the equivalent of $0.50/0.005 kWh=$100/kWh. In another example, if you ask the same person how much they are willing to pay to use a 1000 Watt electric cook stove for an hour, a typical answer would be half the amount as the cell phone ($0.25). This equates to a per kWh price of $0.25/kWh. As the examples show, depending on what the power is being used for, an individual may be willing to pay up to $100/$0.25=400 times difference between two appliances. This is problematic because with the current state of the art, an operator charges a single price per kWh at any given time regardless of the appliance that is being powered. The operator typically only limits the amount of electrical current an individual user can draw, but is unable to control the use of power below the set maximum current. This situation creates a mismatch between what a customer is willing to pay to use an appliance and what the operator is pricing. This pricing mismatch leads to either poor customer satisfaction when the user is powering an appliance they have a low willingness to pay for, or sub-optimal financial returns for the operator when they are powering an appliance that they have a high willingness to pay for.

The following publications exhibit the disadvantage of selling power on a per kWh basis: U.S. Pat. Publ. No. 0197478 entitled "Power management device and system" which issued on Jul. 7, 2016 to Khaitan et al.; U.S. Pat. Publ. No. 0301546 entitled "Power management system" which was published on Oct. 22, 2015 to Hornor. While this arrangement allows an operator to change the price per kWh supplied to a customer based on a number of factors (such as weather or time of day), the operator can only offer one price at any given time. This leads to the mismatch discussed above in operator revenue requirements and customers' willingness and ability to pay.

The state of the art of power utilities is to provide power from a fixed supply designed to accommodate an unpredictable demand. In some cases, suppliers are able to shed load in bulk quantities when demand outstrips supply. An alternative is to turn on extra capacity in response to the heightened demand. Responding to demand is particularly an issue in renewable, distributed power systems exhibiting unpredictable supply (depending on weather) as well as unpredictable demand.

U.S. Pat. Publ. No. 0311752 entitled "Microgrid system structured to detect overload conditions and take corrective actions relating thereto" which was published on Oct. 29, 2015 to Luebke, U.S. Pat. No. 7,218,998 entitled "System and Method for limited power demand in an energy delivery system" which was issued on May 15, 2007 to Neale, and U.S. Pat. Publ. No. 0197478 entitled "Power management device and system" which was published on Jul. 7, 2016 to Khaitan are three examples of systems attempting to address the issues related to unpredictable demand by retroactively responding to those demand conditions. A retroactive approach may be effective for certain levels of excess demand however, beyond a point, load shedding could lead to interruptions of service. To avoid interruptions in service due to excess demand, power systems are often dimensioned to accommodate the relatively small percentage of time that demand is high relative to supply. This is an inefficient use of capital because the majority of time the excess capacity is not utilized.

Another issue present in operating remotely located microgrids and power systems is the lack of availability or reliability of telecommunication networks by which to remotely control the system. If the system is operating in an area that lacks a consistent network connection, remote monitoring and control of the system along with its various billing and payment mechanisms is impaired. The following publications demonstrate systems with monitoring, control, billing, and payment mechanisms reliant on reliable communication networks at the location of the power system: U.S. Pat. Publ. No. 0301546 entitled "Power management system" which was published on Oct. 22, 2015 to Hornor, Spark Meter Functionality, http://www.sparkmeter.io/#architecture, viewed 14 Oct. 2016, and Pat. Publ. No. 0287263 entitled "Solar lighting with pay-as-you go technology" which was published on Sep. 6, 2016 to Marincola. Due to the inherent reliance on mobile network connections, the system may not function properly in areas where the network is slow or unreliable.

Another issue found in the state of the art technology related to microgrids is a reliance on specialized equipment or appliances that have limited supply chains. Often solutions to address energy access propose the use of DC appliances. The majority of appliances available on the market are AC appliances, therefore customers may find it challenging to acquire appliances if they are limited to a DC power supply. Additionally, some examples of state of the art billing and payment mechanisms require specialized equipment to operate the system. If this equipment breaks or gets lost, the system may not function properly. The following publications, Lumeter Product Catalog, http://www.lumeter.net/solutions/: https://www.dropbox.com/s/4qdw8cz9l6xo0pp/Lumeter %20complete-catalogue v5.pdf?dl=0, viewed 14 Oct. 2016, and Pat. Publ. No. 0287263 entitled "Solar lighting with pay-as-you go technology" which was published on Sep. 6, 2016 to Marincola, are examples of a DC power supply with non-standard appliances where specialized billing and payment equipment is demonstrated.

Additionally, many state of the art microgrid control systems operate from a central point of control. In this system architecture, a hierarchical system of commands is sent from a central point to the lower nodes on the network of connected electrical loads. Each node responds to the centralized commands of the system in order to coordinate the dispatch of power throughout the network. The problem with this configuration is that there are numerous points within the system whereby the failure of a single device results in the impaired performance of other downstream devices that haven't themselves failed. For example, if there are three tiers to the communication hierarchy of the network and a communication device on the second tier experiences a fault, the tier three devices downstream from that tier two device are all negatively affected. The following publications provide examples of microgrid control systems that are controlled by a central controller and exhibit the problem of single points of failure: U.S. Pat. Publ. No. 0301546 entitled "Power management system" which was published on Oct. 22, 2015 to Hornor, Spark Meter Functionality, http://www.sparkmeter.io/#architecture, viewed Oct. 14, 2016, and U.S. Pat. Publ. No. 0197478 entitled "Power management device and system" which was published on Jul. 7, 2016 to Khaitan.

The Inventor wishes to address at least some of the above-identified problems.

SUMMARY OF THE EMBODIMENTS

In accordance with a first aspect of the invention there is provided an electricity distribution device/arrangement for distributing electricity to electrical appliances, wherein the electricity distribution device/arrangement includes:
  a connector arrangement which is connectable to an upstream electricity distribution network/supply;
  at least one electrical connection arrangement to which electricity received from the electricity distribution network can be distributed, wherein an electrical appliance can be connected to the electrical connection arrangement, when in use; and
  a control arrangement which includes
    a storage medium on which is stored an electricity distribution program, wherein the program includes electricity distribution details for the electrical connection arrangement, and
    a controller which is configured to control the supply of electricity to the electrical connection arrangement, based on the distribution program, when in use.

An electrical appliance is a device that uses electricity to perform a specific function(s).

The electricity distribution device/arrangement may include at least two electrical connection arrangements to which electricity received from the electricity distribution network can be distributed, wherein an electrical appliance can be connected to each electrical connection arrangement. The electricity distribution program may include electricity distribution details for each electrical connection arrangement. The controller may therefore be configured to control the supply of electricity to each electrical connection arrangement, based on the distribution program, when in use.

The electricity distribution device/arrangement may include at least one monitoring arrangement which is configured to monitor electricity consumption at/through each electrical connection arrangement, in order to determine the electricity consumption of an electrical appliance which is connected thereto, when in use. More specifically, the monitoring arrangement may be configured to measure, in real-time, the current/power drawn at/via each electrical connection arrangement, in order to determine the real-time current/power drawn by the electrical appliance which is connected thereto.

The program may include current/power limits for one or each of the electrical connection arrangements. The controller may accordingly be configured to switch off the supply of electricity to a particular connector arrangement, if the current/power drawn at/via the connector arrangement exceeds the current/power limit therefor.

Each electrical connection arrangement may include an electrical socket so that an electrical appliance can be connected thereto.

The control arrangement may include a switch for each electrical connection arrangement, in order to control the supply of electricity thereto. The switch may be in the form of a relay.

The program may include a time limit(s) or time schedule for each electrical connection arrangement. More specifically, the program may include a specific time period(s) during which electricity is supplied to a specific electrical connection arrangement, and a specific time period(s) during which electricity is not supplied thereto, when in use. The program may therefore specify time limits/schedules and current/power limits for each electrical connection arrangement.

The electricity distribution device/arrangement may be an electrical switching device. The electricity distribution network/supply may therefore be a type of upstream electricity supply/distribution system/network.

The distribution program may be configured to run for a specific time duration. Therefore, after the said time duration has passed, the program needs to be reset or updated. The electricity distribution device/arrangement may include a connector or port via which a removable electronic device can be connected to the electricity distribution device/arrangement, in order to update/reset the program or increase a time duration of the program. Alternatively, or in addition, the electricity distribution device/arrangement may include a communication module/unit which is configured to receive information/instructions (e.g. wirelessly such as via Bluetooth or wired from a central controller) to update/reset the program or increase a time duration of the program. When the removable electronic device is connected to the electricity distribution device/arrangement, the controller arrangement may be configured to compare an identification code/number obtained from the removable electronic device with a unique identification code/number for the electricity distribution device/arrangement which is stored on the/a storage medium thereof. If the identification codes/numbers match, then the control arrangement is further configured to update/reset the distribution program or update the time duration (with a new time duration). In addition to the time duration, other variables, such as current limits and switch operating functions, may also be updated by the control arrangement. In other words, the distribution program is effectively reset.

The removable electronic device may be a removable data storage device/unit, such as a USB stick. In a similar manner, the controller arrangement may be configured to compare an identification code/number received via the communication module/unit with a unique identification code/number for the electricity distribution device/arrangement which is stored on the/a storage medium thereof. If the identification codes/numbers match, then the control arrangement is further configured to update the distribution program with a new time duration. In addition to the time duration, other variables, such as current limits and switch operating functions, may also be updated by the control arrangement The control arrangement may also be configured to update the distribution program by updating current/power and/or time schedules for one or each of the electrical connection arrangements, based on information retrieved/received from the removable electronic device. In other words, the removable electronic device may include updates for the distribution program. In addition, or alternatively, the removable electronic device may include firmware updates for the electricity distribution device/arrangement. In practice, electricity distribution device/arrangements may be installed in/at various people's homes, businesses or institutions.

The electricity distribution device/arrangement may include a display screen on which details of the distribution program is displayed. More specifically, the remaining time of the distribution program may be displayed in real-time on the display screen. A unique identification/serial number of the particular electricity distribution device/arrangement may be displayed on the display screen. A description of the distribution program may also be displayed on the display screen. Optionally, error codes and low credit indications may also be displayed on the display screen.

In accordance with a second aspect of the invention, there is provided an electricity distribution system which includes:
  At least one electricity distribution device/arrangement in accordance with the first aspect of the invention;
  A portable electronic device which is communicatively connectable to the electricity distribution arrangement; and
  A computing device which is remote from the electricity distribution arrangement and which is configured to generate and store instructions relating to, or details of, the electricity distribution program of the electricity distribution arrangement on the portable electronic device, when connected thereto, such that when the portable electronic device is communicatively connected to the electricity distribution arrangement, the electricity distribution program is updated with the said instructions/information.

In accordance with a third aspect of the invention there is provided a method of managing electricity distribution, wherein the method includes:
  Receiving a request from a customer to purchase electricity; and
  Sending/loading electricity distribution information to/onto a portable electronic device of a customer by utilizing a computing device, wherein the information includes:
    Information related to the reset of an electricity distribution program of an electricity distribution device/arrangement of the customer, or to an increase in time duration of the electricity distribution program The computing device may be a smart device. The method may then accordingly include sending/loading electricity distribution information to/onto a portable electronic device of a customer by utilizing a mobile application installed on a smart device. The smart device may be a smart phone or tablet (e.g. a mobile phone).

The electricity distribution information may include a unique identification code/number which is associated with the electricity distribution device/arrangement of the customer.

The electricity distribution information may also include instructions to update the distribution program in terms of current/power limits and/or time schedules for one or more of a plurality of electrical connection arrangements of the electricity distribution device/arrangement of the customer to which an electrical appliance can be connected. The electricity distribution information may also include customer information and/or firmware updates for the electricity distribution device/arrangement.

The electricity distribution device/arrangement may be an electricity distribution device/arrangement in accordance with the first aspect of the invention.

In accordance with a fourth aspect of the invention there is provided a method of distributing electricity to two or more electrical connection arrangements to which electrical appliances can be connected, wherein the method includes:
  receiving electricity, at an electricity distribution device/arrangement, from an upstream electricity distribution network/supply; and
  supplying, by using a control arrangement, electricity to each electrical connection arrangement based on a distribution program which includes electricity distribution details for each electrical connection arrangement.

The distribution program may include a time period(s)/schedule(s) during which electricity should be supplied to a specific electrical connection arrangement, and a time period(s)/schedule(s) during which electricity should not be supplied to the specific electrical connection arrangement.

The distribution program may be stored on a storage medium.

The distribution program may include a specific time duration during which the program is executed. In other words, after the time duration, the electricity will no longer be supplied to the electrical connection arrangements.

The method may include:
- receiving/retrieving an instruction to update/reset the program or increase a time duration of the program; and
- updating/resetting the program or increasing the time duration of the program in response thereto.

The step of receiving/retrieving an instruction to reset the program or increase the time duration thereof may more specifically include receiving/retrieving the instruction from an electronic device or via a wireless communication network. The electronic device may be/include a removable/portable data storage device/unit. The method may therefore include connecting the electronic device to the electricity distribution device/arrangement and thereafter receiving/retrieving the instruction therefrom. The electronic device may be connected to the electricity distribution device/arrangement by inserting it into a connection port/socket of the electricity distribution device/arrangement. The electronic device may a removable memory device/card, such as a memory stick.

More specifically, the method may include receiving/retrieving, at the electricity distribution device/arrangement, an identification code/number from the said electronic device or via a wireless communication network, and comparing it, by using a processor, to a unique identification code/number stored on a database/memory of the electricity distribution device/arrangement. The method may then further include, if the identification codes/numbers match, resetting/updating the distribution program or the time duration of the distribution program (e.g. increasing the time duration). The received/retrieved identification code/number may be received/retrieved from the electronic device.

The method may also include receiving/retrieving an instruction to update the distribution program by updating a current/power limit(s) and/or a time schedule(s) for one or each of the electrical connection arrangements. The instruction may be received/retrieved from the electronic device.

The instruction to update/reset the program or increase a time duration of the program may be received/retrieved from a portable electronic device, and the method may further include:
- Comparing, at the electricity distribution arrangement, a clock time of the electricity distribution arrangement with a time stored on the portable electronic device, and only if the difference between the clock time and the stored time is more than a specified amount/limit, then updating the clock time of the electricity distribution arrangement.

More specifically, the instruction to update/reset the program or increase a time duration of the program may be received/retrieved from a portable electronic device which is disconnectably connected to the electricity distribution arrangement, and the method may further include:
- Disconnecting the portable electronic device from the electricity distribution arrangement and, at a later stage, reconnecting the portable electronic device to the electricity distribution arrangement;
- calculating how long the portable electronic device was disconnected from the electricity distribution arrangement;
- after reconnecting the portable electronic device, comparing, at the electricity distribution arrangement, a clock time of the electricity distribution arrangement with a time stored on the portable electronic device, and
- if the difference between the clock time and the stored time is more than a specified amount/limit, and the amount of time the portable electronic device was disconnected from the electricity distribution arrangement is less than a specified amount/limit, then updating the clock time of the electricity distribution arrangement.

ADVANTAGES

Accordingly, several advantages of one or more aspects are as follows:

a. Customers buy energy services on a subscription/appliance/time basis instead of traditional kWh billing. This allows the operator to price power according to what appliance the power is being used for, ensuring customer satisfaction, and economically attractive pricing for the operator. In other words, the customer's willingness to pay for using a particular appliance matches the price that the operator is providing the power. Additionally, because power is purchased on a subscription time basis, they have a clear link between the prices they pay, and the value provided by the service. The system manages the customer's energy efficiency for them so customers have no risk running out of credit unexpectedly due to overconsumption.

b. Customers plan their energy consumption ahead of consuming, enabling intelligent decision making about how much money they want to spend on energy services. Additionally, because customers plan their consumption ahead of time, customers can shift their demand to times of day that energy is cheaper. Operators are effectively able to proactively shape demand such that over-capacitation of the power system is prevented.

c. Intermediaries use a mobile application to manage billing and payments along with allocating electrical loads on the system. The mobile application can be operated in an offline environment so sales can be made without a telecommunication connection and intermediaries can move to a place with network signal when they need to top up credit or update user programs. In other words, the system can operate in a location that doesn't have a network signal.

d. The system may provide users with AC power, meaning suitable appliances are readily available in local markets. Additionally, a standard USB stick (flash drive) and mobile device may be used to manage user credit. In other words, specialized components are not required to manage the sale of credit to customers.

e. Each electrical switching arrangement is programmed by an intermediary's mobile phone and doesn't require communication with either the power source or any of the other equipment on the grid. In other words, the electrical switching arrangement operates independently so if one device fails it doesn't impact the operation of any other points on the grid.

BRIEF DESCRIPTION OF THE DRAWINGS

The invention will now be described, by way of example, with reference to the accompanying diagrammatic drawings. In the drawings.

DRAWING REFERENCE NUMERALS

Figure 1:
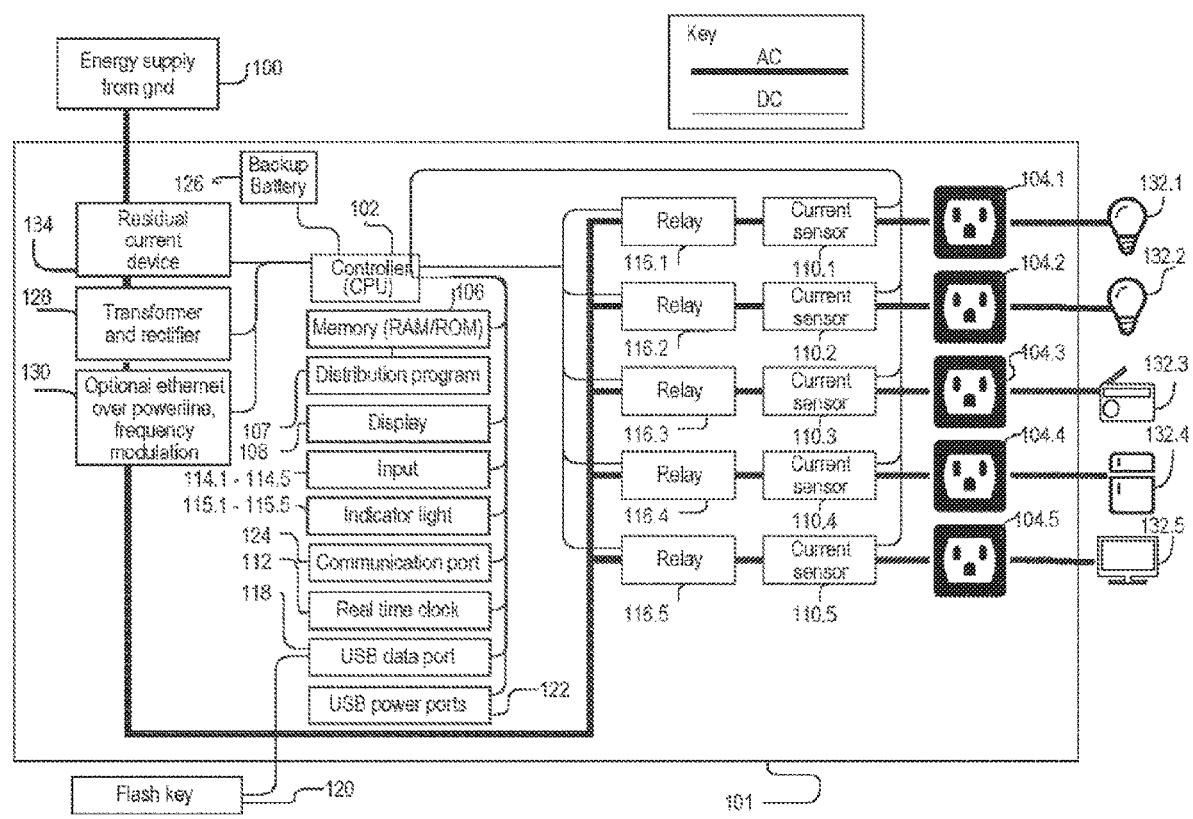
FIG. 1 shows a one-line electrical diagram of an electricity distribution device/arrangement in accordance with the invention.

| | |
|---|---|
| 100 Energy supply from grid | 128 Transformer and rectifier |
| 101 Electrical switching arrangement | 130 Optional ethernet over powerline/frequency modulation module |
| 101i Electrical switching arrangement, alternative embodiment | 132 Electrical appliance(s) |
| 102 Controller (CPU) | 134 Residual current device |
| 104 Electrical sockets | 202 Enclosure |
| 106 Memory (RAM/ROM) | 202i Alternative enclosure |
| 107 Distribution program | 204 Power supply cable |
| 108 Display | 210 Enclosure mounting arrangement |
| 110 Current sensor(s) | 302 Homes, businesses or institutions |
| 112 Communication port | 304 Mobile device |
| 114 Input | 306 Cloud server |
| 115 Indicator light(s) | 308 Communications module |
| 116 Relay(s) | 402 Intermediary |
| 118 USB data port | 404 Customer |
| 120 Flash Key | 408 Mobile app |
| 122 USB power ports | 410 Mobile communication network |
| 124 Communication port | 412 Payment facility |
| 126 Backup battery | 702 Electrical transmission cable(s) |

DETAILED DESCRIPTION OF SPECIFIC EMBODIMENTS

The invention relates generally to an electricity distribution system which utilizes an electricity distribution device/arrangement on which an electricity distribution program is stored and which, when executed, controls the distribution of electricity to a number (i.e. two or more) electrical connection arrangements to which electrical appliances (e.g. TV's or Refrigerators) can be connected.

The electricity distribution device is typically an electrical switching arrangement which is installed at a location which requires electricity (e.g. a house or business), and is connected to an upstream electricity distribution network/supply (e.g. a microgrid or macro-grid) from which electricity is obtained. In one example, a particular house/building may have one designated electrical switching arrangement with multiple sockets (e.g. 5 sockets). In another example, a single electrical switching arrangement may supply a cluster of houses. Each socket of the electrical switching arrangement may then supply a different home/building. The electrical switching arrangement therefore effectively acts as a type of electrical distribution board at a particular location. A plurality of these electrical switching arrangements may therefore be connected to a particular micro-grid.

The electricity distribution program typically includes specific time periods during which a particular electrical connection arrangement (e.g. an electrical socket) should be provided with electricity, and other time periods during which no electricity should be supplied thereto. In addition, the distribution program also includes a maximum current and/or power limit for each electrical connection arrangement. In other words, the currents (or power) drawn through/via each electrical connection arrangement may have certain predefined limits which differ from each other. For example, one electrical connection arrangement (e.g. socket) may be for low-power appliances, such as a television (which has a lower current/power limit) while another electrical connection arrangement (e.g. socket) may specifically be for a high-power appliance such as a geyser (which has a higher current/power limit).

The electrical switching arrangement typically includes a current/power measuring device and a switch for each electrical connection arrangement, which is controlled by a control arrangement. The control arrangement typically includes a processor which then executes the electricity distribution program. The control arrangement therefore effectively operates the switches in order to control the supply of electricity to the appliances in accordance with the electricity distribution program. If the current drawn by one of the electrical connection arrangements exceeds its predefined current/power limit, then the control arrangement will open the associated switch in order to cut off the electricity to the particular electrical connection arrangement. The cut-off will typically extend for a certain predefined time period. The electricity distribution program may more specifically include an instantaneous current draw limit, as well as an average current draw limit, for each electrical connection arrangement which, if exceeded, results in a temporary cut-off.

The electricity distribution program also includes a time duration where after the electrical switching arrangement will no longer supply electricity to the appliances.

In order to reset/increase the time duration, or to effectively "recharge" the electricity distribution program, a customer can approach an intermediary (e.g. a microgrid manager) which typically on-sells electricity credit which he/she purchased from a main electricity supplier to customers (e.g. people linked to the particular micro-grid) on a subscription basis/model. More specifically, the billing for the subscription may include (1) standard kWh billing; (2) subscription time based (e.g. similar to satellite TV subscriptions); (3) timer-based billing (e.g. a countdown timer for when a particular device/appliance is used); and/or (4) a per-device/per-appliance subscription-based billing. The electrical switching arrangement may include a function, which can be activated by a user on the electrical switching arrangement, whereby access is provided to a certain amount of power. This energy provision may essentially be subscription and timer based (i.e. a combination of subscription based and timer based billing). The customer will typically present the intermediary (e.g. micro-grid manager) with an electronic device (such as a portable storage medium). The intermediary will then use a mobile app which is installed on his or her smart device in order to load information related to the reset/recharge of electricity onto the electronic device. The information will typically also include a unique identification code which is associated with an electrical switching arrangement of the particular customer, and information on any possible updates regarding the time periods and/or current/power limits of the individual electrical connection arrangements (if any).

Once the information has been loaded onto the electronic device, the customer can go to the location at which the electrical switching arrangement is installed and connect the device to the electrical switching arrangement (e.g. by inserting it into a connection port of the electrical switching arrangement). The processor of the electrical switching arrangement then firstly retrieves the unique identification code and compares it to the actual identification code of the electrical switching arrangement. If the codes match, then the distribution program is either reset or updated with a new time duration (i.e. the time duration is effectively increased). The distribution program is then also updated with new time periods and/or current limits (if any). In addition, the information can also include firmware updates for the electrical switching arrangement. Furthermore, data related to electricity usage/consumption of/via the electrical connection arrangements which is stored on a local storage medium of the electrical switching arrangement, may be loaded onto the electronic device. This usage/consumption information may then be retrieved by the mobile app installed on the smart device of the intermediary, when the electronic device is connected thereto.

A. Description of Electrical Switching Arrangement—First Embodiment (with Reference to FIGS. 1 & 2)

Reference is now specifically made to FIG. 1, which illustrates one embodiment of an electrical switching arrangement 101 in accordance with the invention. The electrical switching arrangement includes a control arrangement or controller 102, a plurality of electrical connection arrangements in the form of electrical sockets 104.1-104.5 (collectively referred to as 104), a memory module (RAM/ROM) 106, a backup battery 126, a communications port 124, a display 108, and current sensors 110.1-110.5 (collectively referred to as 110) which are configured to measure the current drawn through sockets 104. Controller 102 includes an integrated clock 112 which typically uses a quartz as reference to keep time. The memory module 106 can store a distribution program 107 which dictates operating parameters for controller 102.

Controller 102 connects to inputs 114.1-114.5 (collectively referred to as 114), which take the form of on/off switches, indicator lights 115.1-115.5 (collectively referred to as 115), and relay switches 116.1-116.5 (collectively referred to as 116) for each socket 104. Relay switches 116 are provided between each socket 104 and an upstream electricity distribution network/supply such as a macro or micro grid 100, so that relays 116 can connect/disconnect sockets 104 from energy supply 100, as dictated by controller 102.

Electrical switching arrangement 101 also includes a dedicated USB data port 118 to which a portable electronic device, such as a flash key 120, can be connected (also see FIG. 2), and two USB power ports 122.1, 122.2 (collectively referred to as 122). Power ports 122 are typically disabled by controller 102 if distribution program 107 is no longer active or has expired. In other words, ports 122 are typically only usable when distribution program 107 is still active. The current provided to USB data port 118 is limited with a conventional resistor (not shown) so that flash drives 120 can be used, but higher powered USB devices will charge slowly or not at all.

A residual current device 134 is included between energy supply 100 and sockets 104 to break the electric circuit instantly whenever it detects that the electric current is not balanced between phase conductors, in order to prevent serious injury to a user.

A voltage transformer and rectifier 128 is provided between energy supply 100 and controller 102. In one example, a transformer and rectifier can be used to drop voltage from 230/220 $V_{AC}$ to $5V_{DC}$ in order to operate electronics in electrical switching arrangement 101. Remote monitoring and centralized communication with controller 102 is provided via an auxiliary communication arrangement, such as Ethernet over power line or power frequency modulation 130.

Figure 2:
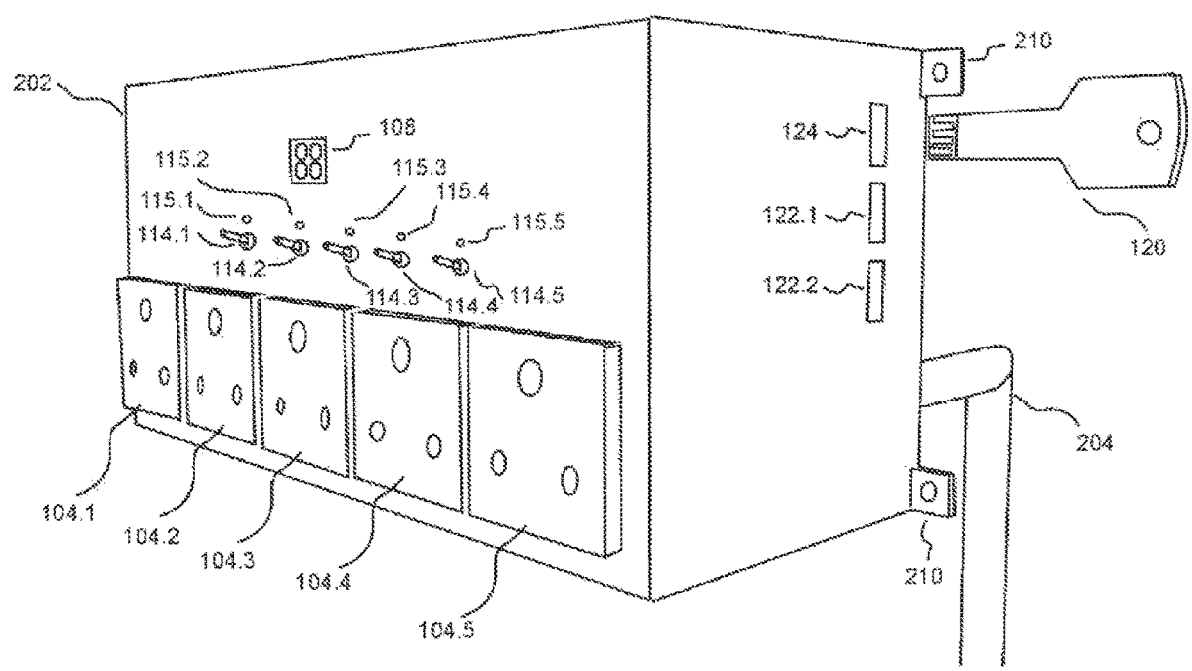
FIG. 2 shows a three-dimensional view of the electricity distribution device/arrangement of FIG. 1, for a single home/business/institution.

The electrical switching arrangement/electrical distribution device 101 illustrated in FIG. 2 is typically for a single home and includes an enclosure 202, a power supply cable 204 which connects it to grid 100 and a flash key 120. Reference numerals 114.1-114.5 and 115.1-115.5 refer generally to input switches 114, and corresponding LED indicator lights 115 for each socket 104 respectively. It will be appreciated that any number of sockets 104, switches 114, and indicator lights 115 can be included. A mounting arrangement 210 is provided on the side of housing 202, for mounting electrical switching arrangement 101 to a support structure, such as a wall.

Each socket 104 is typically labelled for a specific use so that it is clear which devices can be powered by which socket 104. LED lights 115 above each socket 104 indicate if there is power available at a particular socket 104. Switches 114 are used to turn sockets 104 on or off. Also, if a particular light 115 flashes, it indicates that display 108 is showing information about that particular socket 104.

Display 108 typically includes an LCD display and, optionally, other visual indicators. The unique identification/serial number of electrical switching arrangement 101, a description of the existing electricity distribution program 107 (including the expiration date), certain diagnostic error codes, or other information the operator wishes to communicate to the customer or use for troubleshooting purposes, may be displayed on display 108.

B. Operation a. Description of Switching Arrangement Operations (with Reference to FIGS. 1 & 2)

Electrical switching arrangement 101 is typically preprogrammed with electricity distribution program 107 by inserting flash key 120 into USB port 118. The program typically specifies what the time schedules and current/power limits for each socket 104 are. For example, a lighting socket can be programmed to provide 0.2 amps at 230 V to the socket between the hours of 5:00-6:00 and 18:00-23:00, while a TV socket is programmed to provide 0.3 amps at 230 V in the evening from 20:00-22:00. Program 107 typically uses the time of clock 112 in order to run. In other words, the program uses clock 112 to determine when switching should take place. Electrical switching arrangement 101 includes backup battery 126 which is configured to power clock 112 during a prolonged power failure.

Electricity distribution program 107 is typically set/stored on database/memory 106 of electrical switching arrangement 101 by means of an encrypted file stored on flash key 120. Flash key 120 is typically programmed by a mobile application (i.e. a mobile app). When flash key 120 is inserted into port 118, electricity distribution program 107 is decrypted and copied onto internal database/memory 106 of the electrical switching arrangement 101. When flash key 120 is then removed, the program 107 persists for a specified period.

b. Description of Data and Electricity Flow (with Reference to FIG. 3a)

Figure 3A:
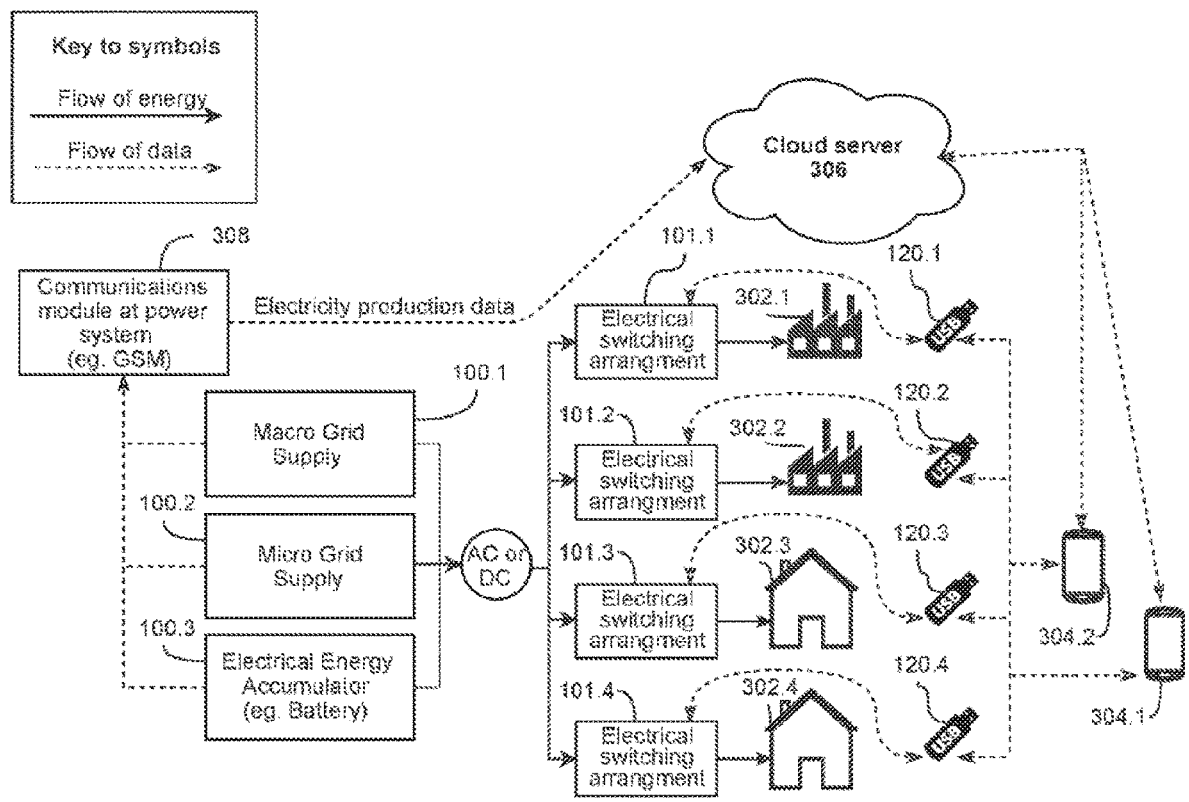
FIG. 3a shows a schematic layout of an electricity distribution network of which the electricity distribution device/arrangement of FIG. 1 forms part.

FIG. 3a illustrates the flow of energy and data throughout a typical microgrid arrangement. Energy is supplied either from a generation source being a macro grid 100.1 or microgrid 100.2 or from battery storage 100.3 (hereinafter collectively referred to as 100). Electrical switching arrangements 101.1-101.4 in accordance with the invention (hereinafter collectively referred to as 101) control the flow of energy to a plurality of homes, businesses or institutions 302.1-302.4 based on predetermined electricity distribution programs 107.

Electricity usage logs are collected and stored on memory 106 of electrical switching arrangements 101. This data is then transferred onto flash keys (USB storage) 120.1-120.4 (hereinafter collectively referred to as 120). When users purchase energy credit from an intermediary, the usage logs are collected on a mobile device 304.1, 304.2 (hereinafter collectively referred to as 304) (e.g. a mobile phone), and uploaded to a cloud server 306 where certain manipulations can be performed on the data. Data also follows in the reverse path/direction. This information includes updated electrical distribution programs 107, device firmware updates or user energy credit. Some data originates in cloud server 306 and is sent to mobile device 304, while other data is calculated by mobile device 304 itself. When a user purchases credit, the updated information passes from mobile device 304 to flash key 120, which is inserted into electrical switching arrangement 101 in order to allow the information to be transferred thereto.

Production data is sent from generation source 100, via a communications module 308 to cloud server 306. By comparing production and consumption data, energy loss can be detected, grid capacity can be predicted and modelled around, and various other analytical operations may be performed.

Figure 3B:
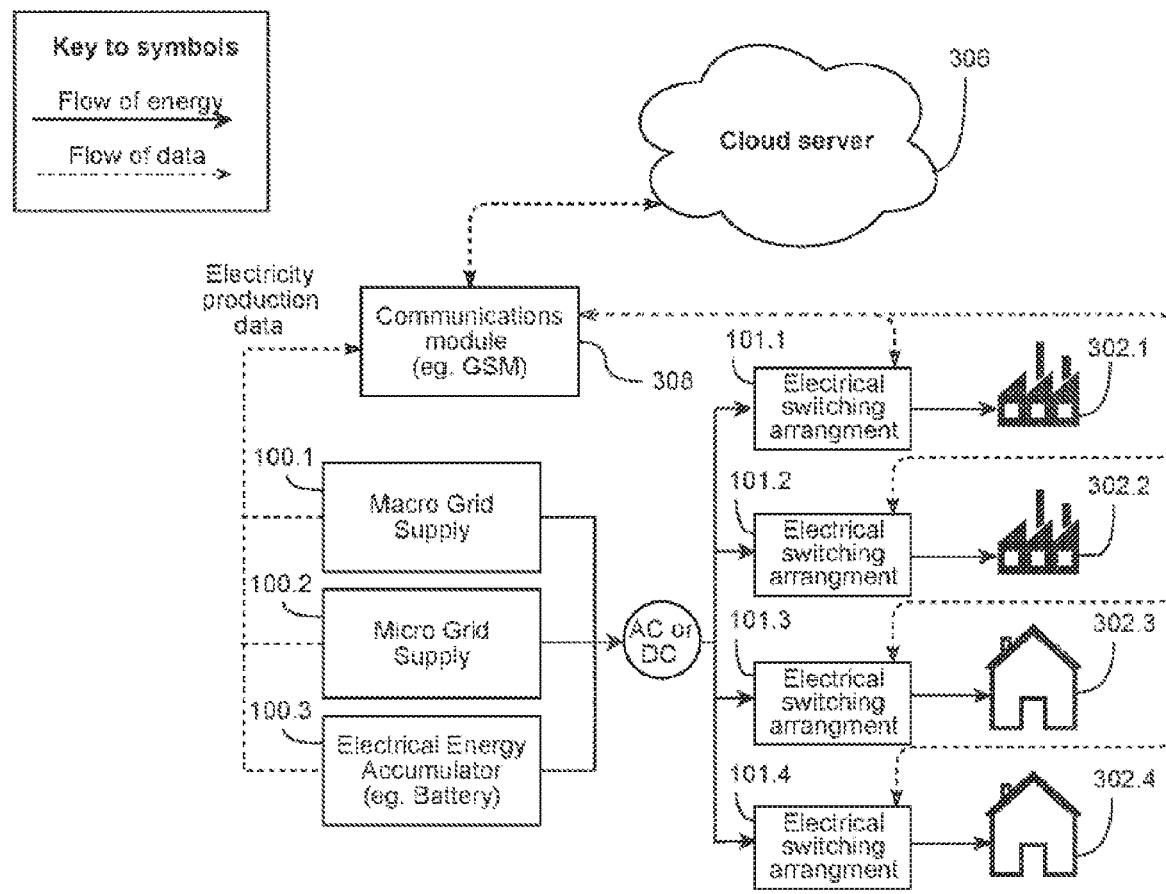
FIG. 3b shows a schematic layout of communications via a central communications module.

FIG. 3b depicts a similar system as shown in FIG. 3a, with the exception of the means by which data is transferred between cloud server 306 and electrical switching arrangements 101. In this example, communications between cloud server 306 and electrical switching arrangements 101 are conducted via communications module 308 and optional Ethernet over powerline, frequency modulation module 130, or communications port 124.

c. Description of Relationships Between Customers, Devices, and Intermediary (with Reference to FIG. 4)

Figure 4:
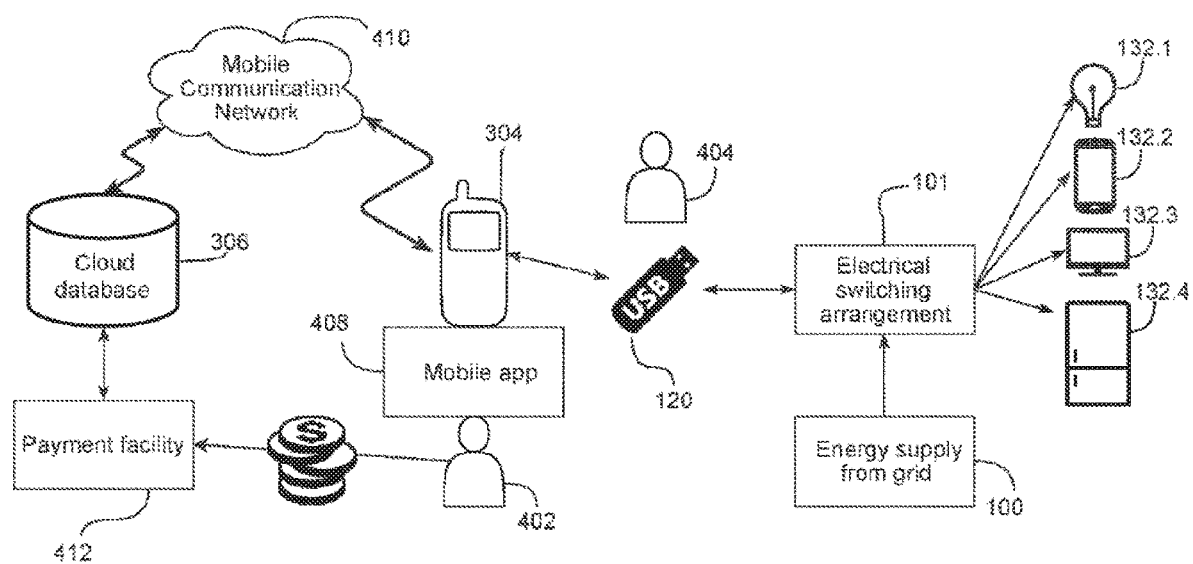
FIG. 4 shows a schematic layout of a process by which energy is supplied to an end user, how the user pays for the energy and how data is transmitted to a cloud based server.

FIG. 4 illustrates how various elements of a conceivable microgrid arrangement interact with one another. An intermediary 402 sells energy credit to a customer 404. Intermediary 402 would typically be a low skilled person, without prior exposure to energy utilization/distribution. Intermediary 402 would typically use mobile device 304 in conjunction with a mobile app 408 to help recharge his/her customers' distribution programs 107 by uploading the relevant recharge/reset details onto the flash keys 120 of the customers (typically with a mark-up so that he/she can make a profit).

Customers 404 would typically be people/companies within the same community as intermediary 402. In selling credit as described, intermediary 402 may help rectify and/or assist in preventing/reducing power theft, troubleshooting electrical switching arrangements 101, power system security and basic maintenance on the power system. Mobile app 408 is configured to update distribution programs 107. More specifically, mobile app 408 is configured to allow intermediaries 402 to update distribution programs 107 for his/her customers (within the capability of the grid/system, i.e. to help ensure that the system/grid is not over-utilized). The system allows for a plurality of intermediaries 402 and a plurality of mobile devices 304.

While electrical switching arrangement 101 is being used, information about the customer's power consumption is stored on flash key 120. More specifically, the information will typically include the following for each socket 104: overload occurrences, when the socket was turned on and off, the average minimum and maximum current/power drawn over a certain specified time period, etc. When customer 404 resets/tops-up its credit from intermediary 402, data logs from flash key 120 are transferred onto mobile phone 304 (more specifically to mobile app 408 installed on phone 304). When phone 304 detects data network availability 410, it automatically uploads this usage information, along with program change requests and intermediary 402 requests for credit to cloud server 306 of the electricity supplier. Cloud server 306 is able to monitor and manipulate the usage information to manage loads on the system, detect energy overuse or theft, schedule system maintenance, offer remote support to customers 404 and send automatic notifications to users 404 and intermediaries 402. Server 306 simultaneously sends any relevant distribution program changes, intermediary credit request approvals and switching arrangement firmware updates to mobile device 304. In this way, the supply and use of electricity can be operated, controlled and monitored remotely, in places that do not have regular Internet connectivity. In other words, mobile app 408 can be used in an off-line environment.

d. Description of Method for Billing and Payments (with Reference to FIG. 4)

FIG. 4 illustrates the process typically used by customers 404 to top-up their energy credit from intermediary 402. The billing/payment scheme/method between customer 404 and intermediary 402 can typically be modelled after well-known mobile payment modules/methods that are currently being used in the industry. However, rather than paying by kWh consumption, customer 404 pays to reset his/her switching arrangement 101 for a specified duration (e.g. daily, weekly or monthly). Customer 404 effectively purchases credit for his/her switching arrangement 101 from intermediary 402 (e.g. an electrical switching arrangement manager) who, in turn, has already purchased bulk credit from a main electricity supplier or the system owner (e.g. a community cooperative).

Intermediary 402 typically utilizes mobile app 408 in order to save reset information/instructions and a unique identification code which is associated with a particular switching arrangement 101 of customer 404 on the customer's flash key 120. The information/instructions and a unique identification code are typically stored in encrypted format (e.g. in an encrypted file). Customer 404 then inserts flash key 120 into USB port 118 in order to update/reset distribution program 107.

The purchasing transaction between intermediary 402 and the main electricity supplier is typically conducted via well-known/standard financial transaction payment facility 412 (e.g. through bank deposits, mobile money, etc.). These transactions are typically conducted on a monthly or quarterly basis, and the reset credit which is associated with the purchase is typically sent via mobile communication network 410 to mobile phone 304. The reset credit information is typically password protected on mobile app 408. Intermediary 402 can then sell the purchased electricity credit at a profit to customers 404.

The information on the purchased reset credit is typically saved on cloud server 306 of the main electricity supplier. Therefore, should intermediary 402 lose his/her phone 304, the relevant reset credit information can be retrieved from cloud server 306 and delivered to a new phone 304 of the intermediary 402 (on which mobile app 408 is installed). The information will then typically be sent via mobile communication network 410.

When installing switching arrangements 101, the location of each one will typically be geo-tagged and distribution programs 107 will be set up based on customer 404 preferences and ability/willingness to pay. In the event that customer 404 wants to modify distribution program 107, mobile app 408 of intermediary 402 can calculate the power availability for a specific customer 404 based on the location of its switching arrangement 101, and the power availability for the particular area by taking into account the distribution programs 107 of all other customers within the area, and possibly the voltage drop between energy supply 100 and customer 404 whose distribution program 107 is being modified. Locational voltage drop, load optimization, and oversubscription algorithms may also be implemented in mobile app 408 or via cloud server 306. This therefore helps to stabilize electricity supply 100 from the electricity supplier within a particular area by reducing the likelihood of electricity demand exceeding supply (i.e. overloading). Changes to distribution programs 107 of customers 404 are made during the same transaction as a reset, by uploading the relevant updates onto flash key 120.

Load shedding programs to monetize economic demand curves at a particular location/region are implemented via communications module 308 and optional Ethernet over powerline, frequency modulation module 130, or communications port 124. Load shedding can be controlled at a per appliance/socket 104 priority setting. In other words, appliances can effectively be ranked and then be switched off as needed according to the ranking, in order to help maintain grid stability. In this case, electrical switching arrangement 101 will typically include communication module/arrangement 124/130 which is configured to allow for a load shedding instruction to be sent to electrical switching arrangement 101.

e. Electrical Switching Arrangement Firmware Operations (FIG. 5)

Customers 404 are able to view the number of days remaining on their current distribution programs by viewing display 108 on their switching arrangement 101 (e.g. after turning the switches 114 on or off).

In the event that customer 404 plugs an appliance into one of sockets 104 that exceeds the current/power limit on that particular socket 104, then electrical switching arrangement 101 will automatically turn off that particular socket 104 for a specified time and notify customer 404 on screen 108. In this way, power/electricity is available for the appliances/devices that distribution program 107 is designed/programmed for and not others. The current limits include an instantaneous current draw limit, as well as an average current draw limit (e.g. if the average current drawn over a certain period exceeds a specific amount). Additionally, switching arrangement 101 identifies the appliance 132 in use by analyzing the pattern of power drawn by appliance 132, and turns off appliance 132 using relay 116, if the current/power consumption pattern of appliance 132 does not match what customer 404 has subscribed to on distribution program 107.

Figure 5:
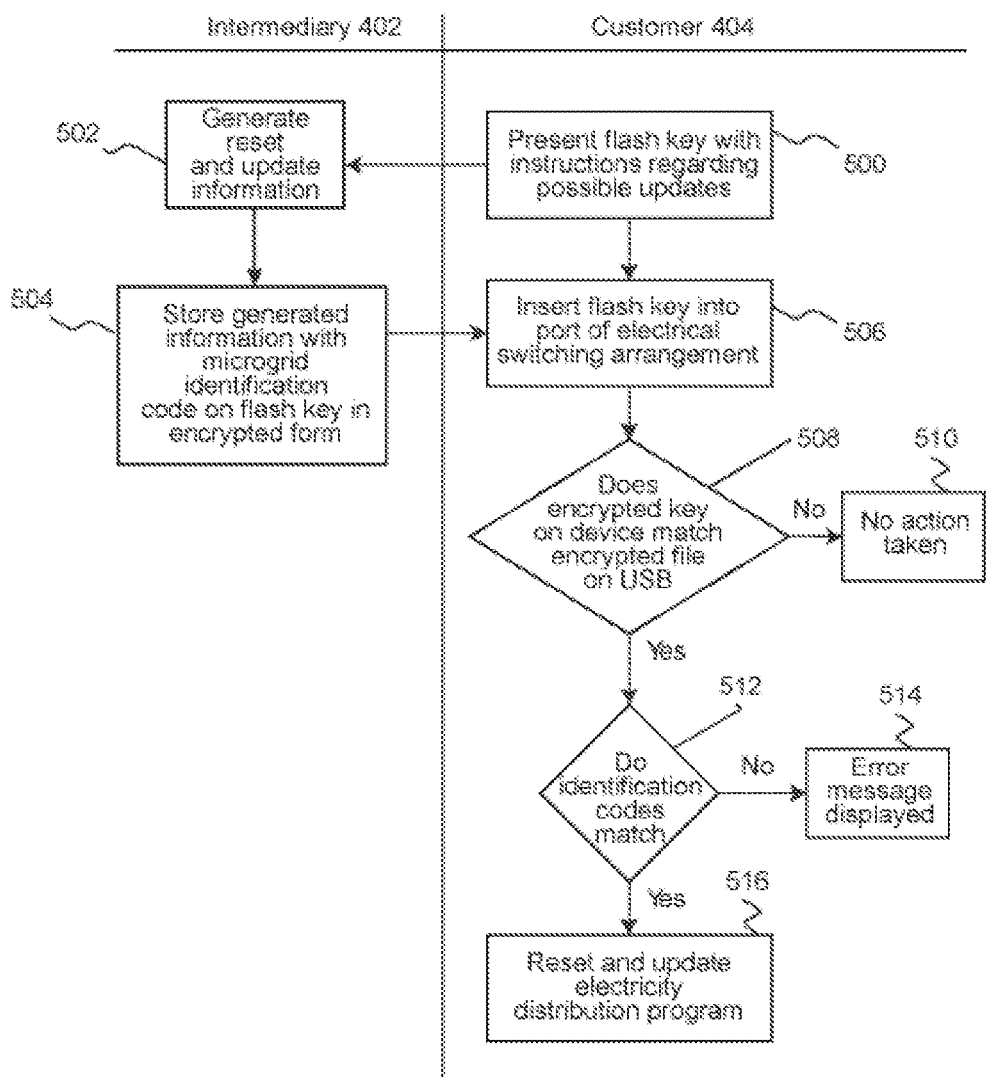
FIG. 5 shows a flow diagram which illustrates a program update function of an electricity distribution device/arrangement in accordance with the invention.

Reference is now specifically made to FIG. 5. In practice, intermediary 402 will typically purchase electricity credit in bulk from an electricity supplier. When customer 404 wants to reset switching arrangement 101 and/or update existing power distribution program 107, it typically presents flash key 120 (at block 500) to intermediary 402. Intermediary 402 then uses mobile app 408 installed on his/her mobile phone 304 in order to generate information regarding the reset of switching arrangement 101 and any updates which customer 404 requires (at block 502). This information is encrypted with an encryption code and stored as a file on flash key 120 (at block 504). It should be noted that other storage mediums may also be used instead of flash key 120. In another example, communication module 124 of switching arrangement 101 can be used for communicating wirelessly with mobile phone 304 (e.g. via Bluetooth). Power distribution program 107 may therefore be updated/reset wirelessly.

Customer 404 then connects flash key 120 to switching arrangement 101 (at block 506). Controller 102 then firstly checks whether an encryption code stored in the memory 106 of switching arrangement 101 (or other internal database of switching arrangement 101) matches the encryption of the encrypted file (at block 508). If no match is found, then switching arrangement 101 will take no action, as if there were no flash key present (at block 510). If a match is found, controller 102 continues to the next step and opens the file (at block 512).

Once the file is opened, controller 102 then compares the identification codes stored on flash key 120 with the unique identification code of switching arrangement 101 (at block 512). If no match is found, then an error is displayed on the display screen (at block 514). If a match is found, distribution program 107 is reset and updated as set out in the information contained on flash key 120 (at block 516). In an alternative example where wireless communication is used for updating/resetting the distribution program 107, the identification code is sent wirelessly to switching arrangement 101, which is then compared to the unique identification code in memory 106 in a similar manner as described above.

f. Description of Device Clock Update Process (with Reference to FIG. 6)

Figure 6:
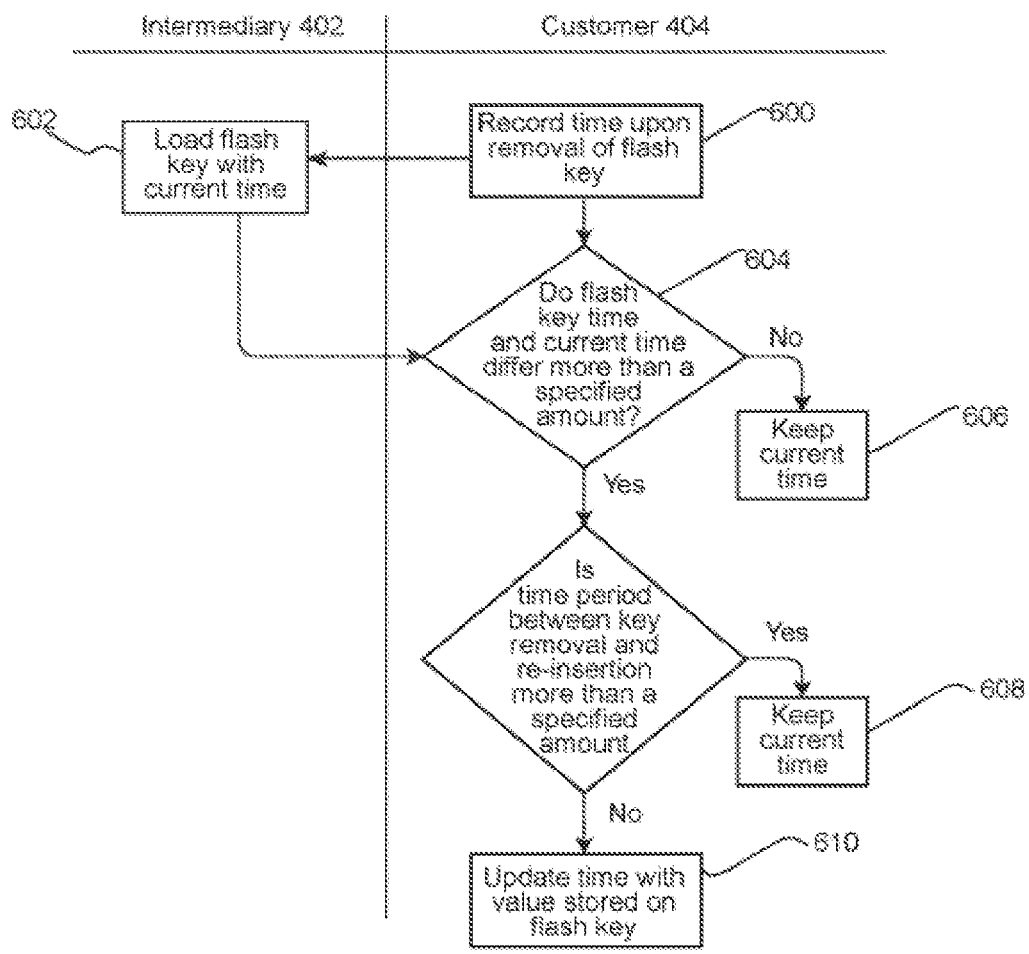
FIG. 6 shows a flow diagram which illustrates a time calibration function of an electricity distribution device/arrangement in accordance with the invention.

The Inventor has found that various switching arrangements 101 connected to a particular microgrid, should be as synchronized as possible. In order to do so, the system makes uses of clocks 112 of the various electrical switching arrangements 101. More specifically, controller 102 is configured to update clock time 112, under certain circumstances, which will be described in the following example:

Reference is now specifically made to FIG. 6. When customer 404 removes flash key 120 from electrical switching arrangement 101 (e.g. to recharge distribution program 107), controller 102 records the current time of clock 112, at which flash key 120 is removed (at block 600).

When customer 404 presents intermediary 402 with flash key 120 for a reset, intermediary 402 will typically connect flash key 120 with mobile phone 304 (on which mobile app 408 is installed) via a USB connection cord or adapter. During the reset process, flash key 120 is loaded with the accurate present time of mobile phone 304 (at block 602).

When customer 404 reinserts flash key 120 into USB data port 118, controller 102 compares the current time of clock 112 with the time saved on flash key 120 (at block 604). If the times do not differ more than a specified amount (e.g. 5 minutes), then the time of clock 112 remains unchanged (see block 606). If, however, the times differ by more than the specified amount, then processor 102 determines the time period between when flash key 120 was removed (at block 600), and when flash key 120 was re-inserted into data port 118. If this time period is more than a specified amount (e.g. 5 minutes), then the time of clock 112 remains unchanged (at block 608). However, if the time period is less than the specified amount then the time of clock 112 is updated with the time stored on flash key 120 (at block 610).

By updating clocks 112 of the various switching arrangements 101, it will help distribution programs 107 thereof to be more closely synchronized with each other. This will allow mobile app 408 to manage the aggregated electricity load and distribution more effectively so that the power system performance is optimized.

C. Alternative Embodiment for Serving Multiple Homes (with Reference to FIG. 7 & FIG. 8)

Figure 7:
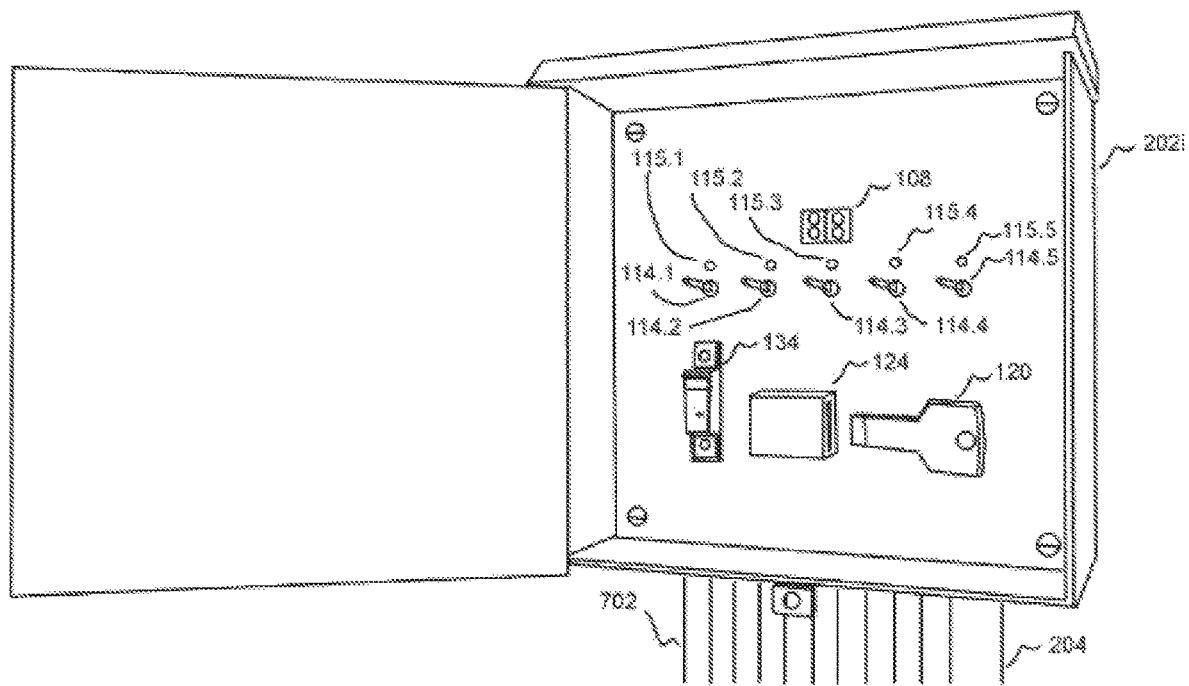
FIG. 7 shows a three-dimensional view of an alternative embodiment of an electrical distribution device/arrangement, in accordance with the invention, for multiple homes/businesses/institutions.
Figure 8:
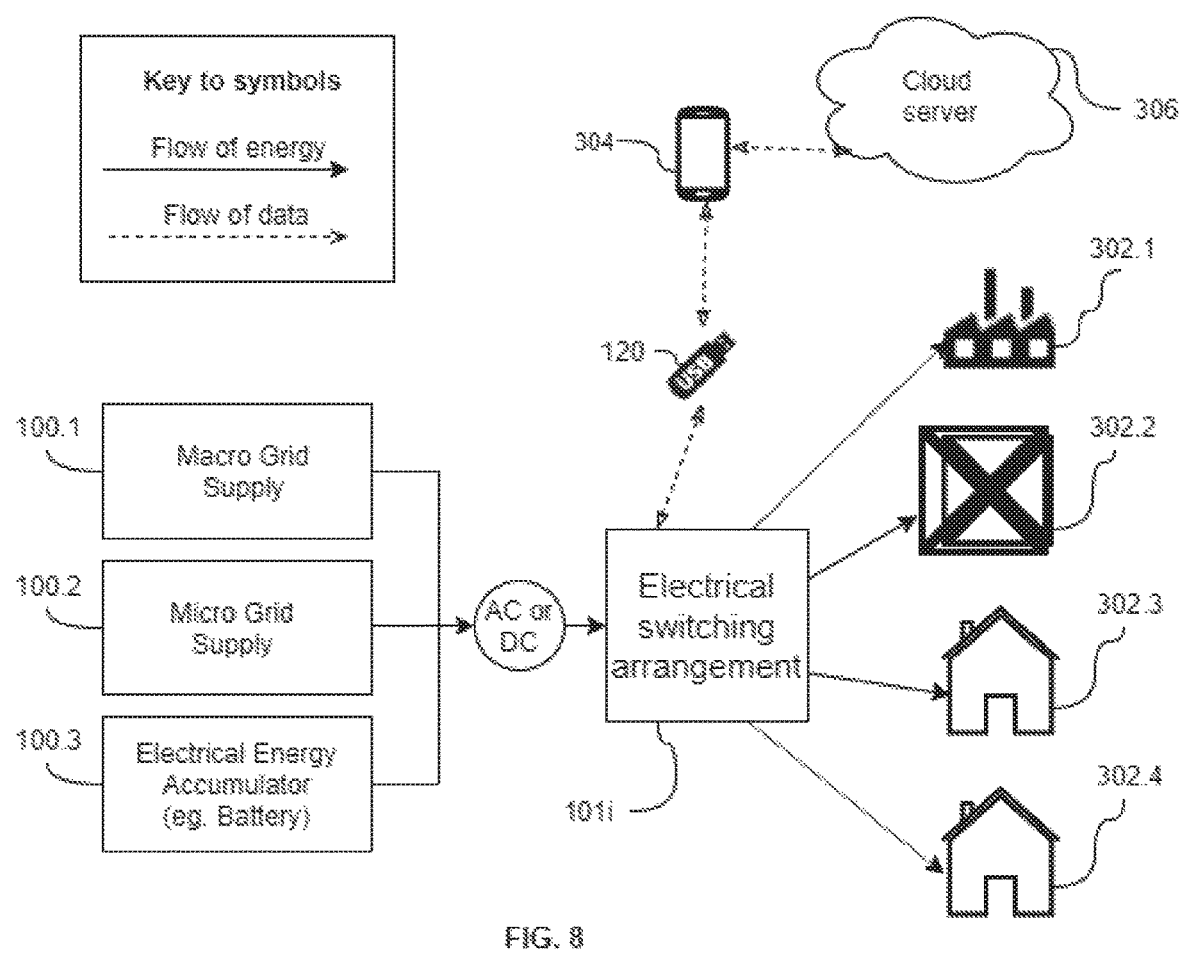
FIG. 8 shows a schematic layout of how the embodiment shown in FIG. 7 distributes power to multiple homes/businesses/institutions.

Reference is now made to FIG. 7 which illustrates an alternative embodiment of an electrical switching arrangement 101 for providing power to a plurality of customers 404. Whereas in this embodiment, the housing 202*i* is a weatherproof housing such that the switching arrangement 101 may be mounted outdoors or indoors. This particular embodiment has a plurality of electrical transmission cables 702 (702.1-702.5) exiting housing 202*i*. Each transmission cable 702 is linked to a downstream electrical load, each of which may be situated at the houses/business premises of different customers 404. In this manner, a single electrical switching arrangement 101 can be utilized to control energy delivery to a plurality of customers 404. This embodiment allows each transmission cable 702 to operate with its own expiration date and limits on current draw.

a. Advantages to this Embodiment

By utilizing one electrical switching device 101 to service multiple customers 404, the operator of the power system is able to reduce the cost per connection. For example, if customer 404 only requires two sockets 104 on device 101 which has five sockets 104, the same device 101 can be shared with up to 3 other customers 404, thereby saving the operator the cost of an additional 3 devices 101.

I. CONCLUSION, RAMIFICATIONS AND SCOPE a. Conclusion

Thus, the reader will see that at least one embodiment of an electrical switching arrangement 101 is a low-cost electronic device that enables the operation of an electrical utility in areas lacking reliable grid connection. The electrical switching arrangement provides power to consumers/customers 404 for high electrical value devices, readily available in the marketplace, in a manner that no previous technology has been able to. By limiting the time of day, and current draw of individual sockets based on predetermined distribution program 107, this device and method can overcome many of the unique physical, economic and operational challenges of managing a power system and electricity billing platform in remote regions. By selling power services on a time/duration basis rather than per kilowatt-hour, a clear link between the price customer 404 pays and the value of the energy service is established.

Electrical switching arrangements 101 effectively enable a community to regulate their own electrical switching arrangement utility in an economically viable, and operationally sustainable way. By limiting power consumption via programmed electrical switching arrangements 101, the electricity distribution system, as a whole, can be efficiently operated by relatively unskilled users in order to help prevent over utilization, and provide power at a price that customers can afford.

As mentioned above, no continuous data link is needed between the energy supplier and electrical switching arrangement 101. No internet connection is required to operate/update electrical switching arrangement 101, since electrical switching arrangements 101 effectively operate in an independent manner.

The Inventor further believes that the way in which clocks 112 are synchronized is effective in helping the distribution programs of various electrical switching arrangements 101 within a network to run in a synchronized manner. This also then allows the system to manage electricity demand in an effective manner.

b. Additional Ramifications and Scope

While the description above contains many specificities, these should not be construed as limitations on the scope, but rather as an exemplification of several embodiments thereof.

It should be noted that many variations of the invention, described above, are possible. For example:

- The use of any number and form of input/output controls and displays beyond the stated switches and LEDs. This could include LCD or LED screens, touch screens, buttons and levers, or omitting them entirely;
- Any form of communication can be used between the electrical switching arrangement and the cloud based server, including power frequency shift modulation, Bluetooth, Wi-Fi, mobile telecommunication network, Ethernet over powerline etc.;
- Similarly, the real-time clock could synchronize its time by any of the means listed above, or other means including GPS etc.;
- Where the proposed embodiment uses USB ports for data 118 and power 122, an alternative data port could be considered such as eSata, firewire, lightning etc.;
- Similarly, any type of storage device could be substituted for USB flash key 120 in the given embodiment, this could include; a flash disk (SD card, MicroSD), a portable hard drive, or the storage onboard a mobile device;
- Any number of power output connections are possible (104 in the first embodiment and 702 in the second);
- Multiple intermediaries 402 could use the system, each with their own mobile device 406. Alternatively, the system may not include any intermediaries 402 and customers 404 would then purchase directly from the operator via connection to the cloud server 306 or other means;
- Cloud server 306 could instead take the form of a local server, or any other type of database or server online or offline;
- The embodiment could be adapted to be used with any form of electricity, AC or DC, and in any voltage;

The firmware on controller 102 may monitor the power consumption from customer 404 in a number of ways, such as monitoring average current, average power, peak current, peak power, or the pattern of either power or current over a specified period, etc.; and The enclosures 202 and 202i may take the form of various shapes and sizes, and be made of various materials (metal, plastics, fiberglass, etc.) to suit various conditions required for installation at a customer's particular location.

I claim:

1. An electricity switching arrangement for distributing electricity to electrical appliances, wherein the electricity switching arrangement includes:
   a. a connector arrangement which is connectable to an upstream electricity distribution network and/or supply,
   b. at least one electrical connection arrangement to which electricity received from the upstream electricity distribution network and/or supply is configured to be distributed, wherein a plurality of electrical appliances are each configured to be connected to the electrical connection arrangement via corresponding sockets; and
   c. a control arrangement which includes
      i. a storage medium on which is stored an electricity distribution program, wherein the program includes electricity distribution details for the electrical connection arrangement,
      ii. a controller which is configured to control the supply of electricity to said electrical connection arrangement, based on said electricity distribution program,
      iii. at least one monitoring arrangement which is configured to monitor electricity consumption at and/or through each said electrical connection arrangement, in order to determine the electricity consumption of one or more electrical appliances which is connected thereto, wherein said monitoring arrangement is configured to measure, in real-time, the current and/or power drawn at and/or via that particular electrical connection arrangement, in order to determine the real-time current and/or power drawn by the electrical appliances which is connected thereto,
   wherein the said electricity distribution program is programmed to include current and/or power service limits for the electrical connection arrangement and said controller is configured to switch off the supply of electricity to the appliance through the electrical connection arrangement, if the current and/or power drawn at and/or via the connector arrangement exceeds a current programmed and/or power service limit therefor, and
   wherein the electricity switching arrangement includes a connector or port via which a removable electronic memory device is configured to be connected to the electricity switching arrangement, in response to which the electrical distribution program is updated to change the current and/or power service limit or increase a time duration of said electricity distribution program,
   further wherein the electricity switching arrangement operates, to switch off the supply of electricity, in an offline communications environment.

2. The electricity switching arrangement of claim 1, which includes at least two said electrical connection arrangements to which electricity received from the upstream electricity distribution network and/or supply is configured to be distributed.

3. The electricity switching arrangement of claim 2, wherein said electricity distribution program includes electricity distribution details for each said electrical connection arrangement.

4. The electricity switching arrangement of claim 1, wherein said electricity distribution program includes a specific time period during which electricity is supplied to a specific electrical connection arrangement, and a specific time period during which electricity is not supplied thereto.

5. The electricity switching arrangement of claim 1, wherein when said removable electronic device is connected to said electricity distribution arrangement, said controller arrangement is configured to
   a. compare an identification code and/or number obtained from said removable electronic device with a unique identification code and/or number for said electricity distribution arrangement which is stored on the/& storage medium thereof, and
   b. if the identification codes and/or numbers match, to update and/or reset said electricity distribution program or update the time duration.

6. The electricity switching arrangement of claim 1, which includes a communication module and/or unit which is configured to receive information and/or instructions wirelessly to update and/or reset said electricity distribution program or increase a time duration of said electricity distribution program.

* * * * *